United States Patent [19]

Nayar

[11] 4,294,395
[45] Oct. 13, 1981

[54] BRAZING PROCESS

[75] Inventor: Harbhajan S. Nayar, Murray Hill, N.J.

[73] Assignee: Airco, Inc., Montvale, N.J.

[21] Appl. No.: 23,377

[22] Filed: Mar. 23, 1979

[51] Int. Cl.³ .............................................. B23K 1/04
[52] U.S. Cl. .................................. 228/220; 228/248; 228/263 D
[58] Field of Search ........... 228/220, 248, 219, 263 D; 148/16, 20.3

[56] References Cited

U.S. PATENT DOCUMENTS

| Re. 29,737 | 8/1978 | Bottum | 228/248 X |
| 2,085,587 | 6/1937 | Hotchkiss | 228/220 |
| 3,432,910 | 3/1969 | Bottum et al. | 228/248 X |
| 4,016,011 | 4/1977 | Asai et al. | 148/20.3 X |

FOREIGN PATENT DOCUMENTS 50-2277 6/1975 Japan ....................... 228/20

Primary Examiner—Joseph H. McGlynn
Assistant Examiner—K. J. Ramsey
Attorney, Agent, or Firm—David L. Rae; Larry R Cassett

[57] ABSTRACT

Ferrous parts are bonded together in a copper brazing furnace under suitable temperatures and a furnace atmosphere which, in the absence of parts, is comprised of at least 90% nitrogen, up to 7% combined hydrogen and carbon monoxide with hydrogen being greater than 50% of the total of CO and $H_2$ and having a dew point between approximately $-40°$ to $+10°$ C. In the preheat section of a continuous belt furnace or the like, the dew point may range between $-20°$ to $+10°$ C. while in the furnace hot zone, the dew point is maintained between approximately $-40°$ to $-10°$ C. A brazing paste which is preferably a combined copper and 25–75% copper oxide paste is utilized. With such furnace atmosphere and paste composition, clean part surfaces, which permit superior wetting by molten copper and thus acceptable copper flow and penetration into the joint being bonded, are obtainable. The furnace atmospheres utilized enable increased life to be obtained from furnace materials such as brick insulation, muffles, conveyor belts, and heating elements.

15 Claims, 2 Drawing Figures

BRAZING PROCESS

BACKGROUND OF THE INVENTION

The present invention relates to copper brazing and more particularly to the copper brazing of ferrous parts under particular furnace atmospheres which enable improved bonding and increased furnace material life.

Copper brazing is a commonly utilized technique for joining ferrous parts with close fitting joints (less than 0.1 mm wide gaps). Typically, such ferrous parts may comprise carbon steel, alloy steel and stainless steel and by melting a copper preform or paste material in a brazing furnace, molten copper is caused to flow into such gap and upon cooling, a copper bonded joint will be produced to provide liquid or gas tight seals. The preform which is essentially a solid copper bearing member or paste material is placed in controlled amounts near the close fitting joint to be brazed. The term "copper brazing" will include the use of pure copper and copper alloys containing relatively small quantities of tin, iron, nickel, phosphorus, as may be required to produce a particular bonded joint.

Copper brazing operations are typically carried out in a continuous conveyor (belt) furnace which consists of four notional zones or sections. Initially, the furnace includes a front throat or preheat section in which a temperature of up to approximately 700° C. is established. The next furnace section in the direction of belt travel is the hot zone wherein the parts to be brazed are exposed to a maximum temperature and the copper or copper alloy of the preform or paste material melts and penetrates into the close fitting joint to be bonded. Typically, the length of a furnace hot zone or section is between 5–10 ft and the interior is lined with insulating brick or other suitable material. Commonly, the hot zone is heated by silicon carbide (Globar) heating elements and some furnaces are fitted with a metal alloy muffle in order to provide a more air tight interior of the hot zone. Muffle furnaces may be heated by use of natural gas from outside the muffle or from the use of silicon carbide heating elements either inside or outside the muffle. A slow cool section which is generally less than half the length of the hot zone of the furnace receives parts therefrom and enables a slow cooling of the parts to approximately 600° C. in order to prevent warpage or distortion. A normal cool section follows the slow cool section in the direction of belt travel and enables a sufficient part temperature drop before such parts leave the exit end of the furnace while also preventing oxidation and discoloration of the parts and conveyor belt. Typically, the length of this section is at least as great as the length of the hot zone and may, in fact, be considerably longer.

Depending upon the particular copper brazing material (i.e. paste, etc.) utilized the brazing operation is performed in the furnace hot zone at a temperature of between 850°–1150° C. under a reducing atmosphere with a total residence time of less than 15 minutes in the hot zone. This relatively low residence time is effective to ensure a high production (i.e. throughput) rate of brazed parts. Typically, pure copper brazing is effected under hot zone temperatures of between about 1090 and 1150° C. whereas copper-alloy brazing is generally carried out at temperatures of between about 850°–1050° C. In either case; however, the hot zone residence time is less than 15 minutes to ensure high throughput.

As mentioned above, the brazing operation is achieved under a reducing atmosphere although the particular composition of such atmosphere will be controlled by a set of critical requirements. In brief, these requirements may be referred to as clean surfaces, no surface decarburization, brazing material sources and furnace materials. Each of these requirements will now be discussed in some detail as will the inability of prior art brazing atmospheres in meeting these requirements.

Prior to the melting of copper or copper alloy (either from a solid preform or paste form) in the furnace hot zone, it is essential that surfaces to be joined together are metallurgically clean. The term "metallurgically clean" is utilized here to mean that the particular surface is "wetting" to molten copper or copper alloy and that this surface condition allows such molten metal to spread and penetrate into the joint to thereby form a strong brazed joint and good liquid or gas-tight seal. More specifically, the term "metallurgically clean" requires that the surfaces in and around the joint are virtually free of any oxide, carbide, soot (carbon) or any other material that reduces the "wetting" behavior between the molten copper or copper alloy and the ferrous part to be brazed. This initial requirement for successful brazing atmospheres dictates that such atmospheres be reducing but not highly carburizing to the ferrous part in order to ensure metallurgically clean surfaces. Thus, for plain iron and carbon steels under normal production conditions, a $H_2/H_2O$ ratio (or equivalent $H_2+CO/H_2O+CO_2$) of at least five is required. For low alloy steel parts, this ratio should be at least about 30 while for high alloy parts such as stainless steel, the minimal practical ratio is about 1,000. As a general rule, high alloy parts cannot tolerate any carburizing tendency of the brazing atmosphere.

The second requirement which must be satisfied by brazing atmospheres is the avoidance of surface decarburization. Certain steels such as medium to high carbon steels, low to medium alloy steels, certain high alloy tool steels, etc. contain about 0.3–1.0% carbon. When such ferrous materials are brazed, it is essential that decarburization be avoided in order to retain the metallurgical properties of such materials. Thus, the brazing atmosphere utilized must be essentially neutral in order to avoid decarburization and preclude carburization of the ferrous part surfaces in and around the joint as "wetting" and penetration of the brazing material will be impeded by carburized part surfaces.

As mentioned previously, copper or copper alloy brazing materials are typically applied to close fitting joints of parts to be bonded as solid preforms (100% dense) or as paste materials. When a copper paste is utilized, the brazing atmosphere must meet the aforementioned requirements of clean surfaces and avoidance of decarburization and additionally the paste must not leave residues which cause beading of molten copper which impedes the wetting properties thereof. Brazing pastes consist of a fine copper or copper alloy powder suspended in a suitable "vehicle" which contains a thickening agent and other additives. The thickening agent, etc. is necessary to prevent separation of the powder and thus assures the ability to apply a controllable amount of uniform paste to a particular joint to be brazed. Typically, the various vehicles, thickening agents, etc. are organic based (glycerine, glycol, petroleum, etc.) and these pastes contain no fluxing agents.

The copper or copper alloy powder content is usually between 60 and 80% by weight of the paste to ensure good penetration of molten copper into a joint. If is mandatory that the vehicle, thickening agent, etc. be completely volatilized and burned to avoid leaving any residue prior to the melting of the metallic copper powder. In the absence of such burning, the molten copper metal tends to form in beads outside of the joint rather than penetrate the same and in addition, the residue reduces the esthetic appearance of the brazed joint. It will be understood that although the organic components of a paste may be thermally decomposed to yield carbon and hydrogen gas, carbon remains in a solid or soot form and tends to carburize part surfaces without wetting the same. Also, the solid residue (soot) interferes with plating or other operations and requires further cleaning of the part surfaces. Consequently, the brazing atmosphere must supply an oxidant in order to enable complete volatilization and burning of such organic components which then exist in a gaseous phase and leave no residue. However, it will be seen that those atmospheres commonly used for brazing which contain an oxidant also tend to oxidize furnace materials such as conveyor belts or the like and thus reduce the useful life of such materials.

The most widely used brazing atmosphere heretofore has been rich exothermic gas which is typically comprised of 15% hydrogen, 10% carbon monoxide, 2.5% moisture, 5% $CO_2$ and the balance nitrogen. The organic components of brazing paste are effectively removed under rich exothermic atmospheres; however, this atmosphere is decarburizing to medium to high carbon steels and other carbon containing alloys. Also, it is not sufficiently reducing to high alloy parts such as stainless steel and it is highly oxidizing to various furnace materials such as muffles and conveyor belts thus severely limiting the useful life thereof. Other types of brazing atmospheres have been utilized and these include endothermic gas (38% $H_2$, 19% CO, 0.82% $H_2O$, 1% $CO_2$ and balance nitrogen). Endothermic gas is not particularly effective in the burning of organic components of brazing pastes and other atmospheres such as wet and/or dry hydrogen are considerably more expensive and more flammable and explosive. Disassociated ammonia (75% $H_2$, 0.003% $H_2O$, balance nitrogen) is not excessively expensive although it is very reducing to conveyor belts, furnace brick and heating elements. It is also not an effective "burner" of the organic components in the paste. Like hydrogen it is highly flammable and explosive.

As mentioned above, the brazing atmosphere can also affect various properties of furnace materials such as conveyor belts, insulating brick and heting elements. Typically, a conveyor belt is comprised of stainless steel, 80 nickel-20 chromium alloy, iron base with 30% nickel, 20 chromium and columbium stabilized and Incolloy 600 Series. All of these alloys which are effective to withstand high temperatures existent in a brazing furnace contain over 15% chromium which tends to oxidize easily unless the atmosphere is highly reducing. Also, these materials tend to carburize and become very brittle if the atmosphere is carburizing. Furthermore, when the atmosphere is too dry and reducing, the belt alloy lacks protective oxide layers and belt links tend to mildly weld together thus, as such as belt traverses a drum at the exit end of the furnace, the belt "crackles" and generally loses strength. Very dry and reducing brazing atmospheres also lower the life of silicon carbide or Globar heating elements. When such atmospheres are dry, reducing and carburizing, belt damage is even more rapid. Consequently, atmospheres which are too oxidizing, reducing or carburizing negatively affect the life of conveyor belts, related high alloy components of the furnace such as muffles and in some cases heating elements themselves.

Brazing furnaces typically are comprised of brick insulating materials in the interior of the hot zone which materials generally contain small amounts of relatively easily reducible oxides. Thus, these oxides will be reduced if the atmosphere is too reducing which in turn tends to decrease the useful life and effectiveness of such insulating bricks. For example, if the brazing atmosphere is both reducing and contains large amounts of carbon monoxide, bricks are weakened by decomposition of CO at about 500°-650° C. which results in carbon deposits interior of the brick which in turn leads to excessive internal stresses and cracking. Higher amounts of hydrogen result in more heat losses. Furnaces which include high alloy interior muffles will also have relatively short useful lives if the brazing atmosphere is either excessively carburizing or oxidizing or reducing as mentioned above. Furnace heating elements which are typically comprised of silicon carbide deteriorate under highly reducing atmospheres as silicon carbide is gradually reduced to lower levels thereof and eventually silicon. If this reduction of silicon carbide is non-uniform, the heating elements tend to develop "hot spots" and consequently uneven heat patterns are established in the furnace.

Accordingly, a clear need exists for brazing atmospheres and various brazing pastes such that during brazing of ferrous parts clean part surfaces are maintained, part surface carbon levels remain essentially unchanged and the life of furnace materials is increased.

OBJECTS

It is an object of the present invention to provide improved methods for copper brazing of ferrous parts.

It is a further object of the present invention to provide improved brazing atmospheres under which clean part surfaces are maintained prior to the melting of copper in brazing materials.

It is yet another object of the present invention to provide an improved copper brazing process in which good wetting of part surfaces occurs and strong brazed joints result.

It is still another object of the present invention to provide brazing atmospheres which enable organic components in brazing pastes to be essentially completely removed without decarburizing or carburizing part surfaces.

It is a further object of the present invention to provide improved brazing atmospheres thereby enabling greater useful lives of furnace materials to be obtained.

It is yet another object of the present invention to provide improved brazing atmospheres which are substantially independent of hydrocarbon sources for production thereof.

Further objects of the present invention are to provide a brazing system which reduces heat losses, reduces explosion hazard and reduces materials and maintenance costs while being suitable for use with a range of work part compositions.

It is yet a further object of the present invention to provide improved copper based brazing paste materials.

Other objects of the present invention will become apparent from the detailed description of an exemplary embodiment thereof which follows, and the novel features of the invention will be particularly pointed out in conjunction with the claims appended hereto.

SUMMARY

In accordance with the invention, ferrous parts are brazed under atmospheres which in the absence of such parts in a furnace are comprised of about 1.0 to 7% combined hydrogen and carbon monoxide with the hydrogen content exceeding the CO content, a dew point of $-40°$ to $+10°$ (0.01 to 1.22% $H_2O$) and at least 90% nitrogen. Preferably, the brazing atmosphere will exhibit varying dew points in different sections of a furnace which is typically a continuous, belt furnace. Thus, in portions of the furnace under increasing temperatures of say 600°–900° C., the dew point may range from $-20°$ to $+10°$ C. while in portions of the furnace wherein temperature decreases from a peak of approximately 1000°–1150° C. to 600° C., the dew point will preferably be established between $-40°$ to $-10°$ C.

In order to effectively provide molten copper for brazing ferrous parts, a paste having as its principal ingredient $25 \propto 75\%$ copper oxide, balance copper is preferred. This paste utilized with brazing atmospheres according to the invention enables the formation of good brazed joints with good joint penetration and no beading, residue or soot formation. By use of brazing atmospheres and copper based paste mentioned above, the surfaces of ferrous parts to be brazed are maintained highly or "metallurgically" clean and good wetting of part surfaces occurs. This in turn leads to strong bonds and the production of effective liquid-gas tight seals. Also, the brazing atmospheres according to the invention are essentially reducing and neutral to carbon in part surfaces and thus, metallurgical properties of part surfaces are not degraded during brazing. By use of some oxidant such as moisture and/or oxygen derived from reduction of the copper oxide in the paste, organic components of paste vehicles are volatilized and burned to generate gases as opposed to being thermally decomposed which leads to soot or residue on part surfaces and impedes the wetting thereof. Also, by controlling oxidant levels, furnace materials such as stainless steel belts, alloy muffles, etc. are not rapidly oxidized and the useful life thereof is extended. Furthermore, by limiting the reducing constituents in brazing atmospheres to about 7% as noted above, furnace insulating materials and heating elements are not rapidly reduced and the useful life of such items is prolonged.

BRIEF DESCRIPTION OF THE DRAWING

The invention will be more clearly understood by reference to the following description of exemplary embodiments thereof in conjunction with the following drawing in which.

DESCRIPTION OF PREFERRED EMBODIMENT

Figure 1:
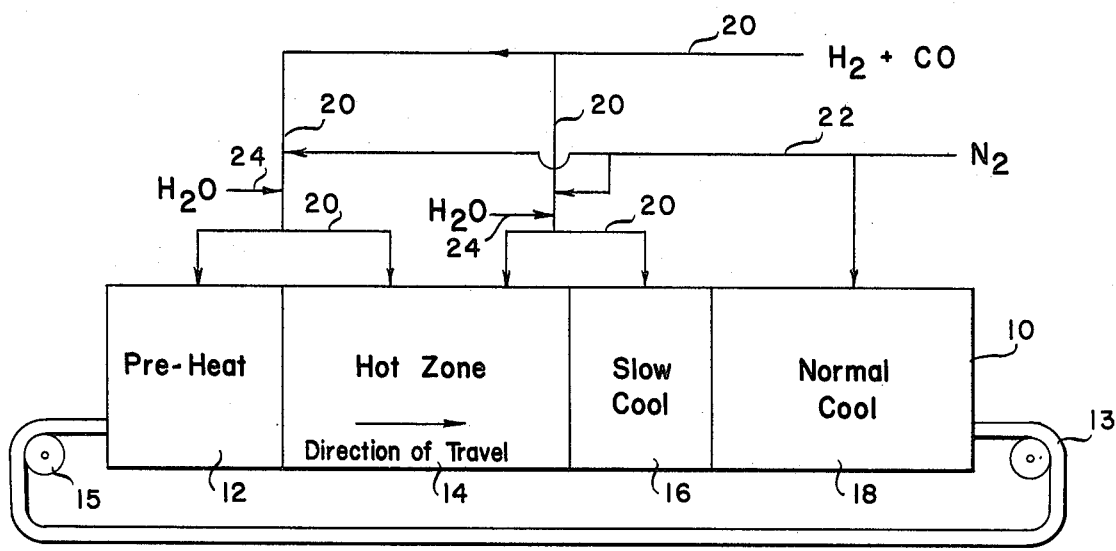
FIG. 1 is a diagrammatic view of a brazing furance in which the process according to the invention may be practiced.

As will be apparent from the foregoing discussion of the prerequisites for a successful brazing operation, there are several constraints imposed upon brazing atmospheres. As noted, these atmospheres must be reducing to the part being brazed, essentially neutral to part surface carbon and somewhat oxidizing to the paste vehicle to effectively burn the organic constituent in a relatively short time. In addition, the cost of such atmospheres must not be excessive if the brazing process is to be economical and the use of a given brazing atmosphere must not result in unsafe operating conditions. Thus, although some atmospheres such as rich exothermic gas are essentially reducing in nature and relatively neutral to part surface carbon of low carbon ferrous parts, this gas is oxidizing to other materials due to the presence of significant quantities of moisture and $CO_2$ which, as mentioned above, tends to rapidly degrade furnace belts and muffles. Also, rich exothermic gas is invariably produced in a generator from a process for combusting methane or natural gas and such generators are not susceptible to adjustments to enable various gas compositions to be obtained. Accordingly, if such generators are adjusted so as to attempt to increase the hydrogen content of rich exothermic gas to increase its reducing ability, generators tend to soot and become considerably less efficient than when producing exothermic gas of the composition mentioned above. In previous years when the cost of natural gas was relatively low and there were no problems of its availability, the relatively short belt life obtained from use of such atmospheres in brazing processes could be economically sustained. However, in view of the increasing cost of natural gas and limits on its availability, the attractiveness of rich exothermic gas as a brazing atmosphere is considerably diluted. As will be subsequently apparent, the brazing atmospheres according to the present invention do not suffer from the foregoing deficiencies of rich exothermic gas and increased useful life of furnace components is obtainable.

In brazing processes according to the invention, brazing atmospheres established in the furnace without parts are comprised of a minimum of 90% nitrogen, a maximum of 7% hydrogen plus carbon monoxide with hydrogen being greater than CO and a dew point of $-40°$ to $+10°$ C. are utilized. A brazing atmosphere of the foregoing composition is introduced into a conventional furnace at one or more locations and is measured after equilibrium either prior to or subsequent to the passage of ferrous parts therethrough. The reason for so describing the brazing atmosphere according to the invention is that different parts to be brazed will cause oxygen to be introduced along with such parts which oxygen is somewhat difficult to determine at a given point in a brazing process. Also, paste materials on such parts will release $CO_2$, $H_2$, etc. into the furnace atmosphere and as each paste releases different amounts of such gases, it is preferred to define brazing atmospheres according to the invention in the absence of parts. Furthermore, the precise atmosphere composition in a brazing furance during operation thereof in accordance with the present invention will vary in that the dew point and reducing constituents be altered so as to best utilize the properties of the atmosphere and brazing material which most facilitate the production of strong, solid brazed joints between ferrous parts at the lowest possible cost and flow rates. Thus, in the preheat section of a brazing furnace, the dew point may be somewhat higher than in the hot zone thereof and, for example, in the preheat section, a dew point of $-20°$ to $+10°$ C. (0.1 to 1.22% $H_2O$) may exist while the hot zone, the dew point is between $-40'$ to $-10°$ C. (0.01 to 0.26%

$H_2O$). In each zone of the furnace, however, hydrogen and carbon monoxide do not exceed 7% with hydrogen being in greater amounts than CO. Preferably, hydrogen and CO constitutes at least 1.0% of the brazing atmosphere. It will be understood that by maintaining a slightly higher dew point in a preheat section of the furnace, i.e. in that portion of the furnace at which temperature is maintained between 600°–900° C., a greater moisture level will assure a higher oxidant concentration in the brazing atmosphere and thus promote a more effective burning and volatilization of organic components in a brazing paste without altering part chemistry or decreasing belt life. The total moisture and carbon dioxide concentration of the brazing atmosphere should not exceed 3.0% and, if $CO_2$ is utilized, it should not exceed 2.0% of such atmospheres. Moisture, however, is preferred as an oxidant in the atmospheres according to the invention. The organic components of the paste are liberated from the paste as gases and hence do not leave solid residues which generally impede the wetting of part surfaces and such organic components are volatilized before the copper of such paste begins to melt and flow. Thus, by providing a somewhat greater dew point in a preheat section of the furnace, a better burning of organic paste components occurs without damage to furnace parts such as the belt and/or alloy muffle. However, by retaining a lower dew point in the atmosphere in the hot zone of the furnace, a lower oxidant supply is thus available and oxidation of furnace components such as the furnace belt is reduced considerably in comparison with such oxidation when rich exothermic gas is utilized as a brazing atmosphere.

In the hot zone of the furnace, under brazing atmospheres according to the invention, the copper of the paste material will melt and due to the relative lack of oxides, carbides, etc., such molten copper will readily flow over the surfaces to be joined as such surfaces exhibit a good wetting characteristic. In this manner, flows of molten copper into close fitting joints will assure that strong and essentially liquid or gas tight seals will be formed. Subsequent to such passage through a furance hot zone, the parts are permitted to undergo a slow cool from, for example, a brazing temperature of about 1000°–1150° C. to approximately 600° C. to avoid warpage and/or discoloration. Subsequent to a slow cool of brazed parts, the parts may undergo a normal cooling to temperatures at which such parts may be removed from the furnace.

It will be understood that the brazing atmospheres according to the present invention will exist in the portion of a continuous furnace in which the temperature is above 600° C. and, for example, in the portion of the normal cooling zone of a furnace, the requirement for hydrogen and carbon monoxide and moisture will be not be present and this zone may be maintained under an essentially nitrogen atmosphere to avoid oxidation.

In accordance with the invention, it is preferred to utilize a combined paste comprised of 25–75% copper oxide and the balance copper paste. As the brazing atmosphere according to the invention contains a relatively low portion of oxidizing materials, e.g. $H_2O$, etc., some oxygen is still necessary to enable removal of organic components in the brazing paste. It is preferred not to increase the dew point of the brazing atmosphere because of a requirement not to decarburize part surfaces and thus, it is preferred to supply at least a portion of the oxidant required to so volatilize organic components of the paste in the form of copper oxide. Thus, by utilizing a composite paste containing 25–75% copper oxide paste, balance a copper paste, the copper oxide is reduced upon passage through the preheat zone of a furnace, sufficient oxidant is thus supplied locally to the complete furnace atmosphere to enable effective removal of organic components of the paste without decarburizing part surfaces or excessively oxidizing furnace materials such as belt or muffle alloys. However, it is within the scope of the present invention to select a particularly effective paste of the type mentioned above for use with a particular brazing atmosphere and several of such paste compositions utilized with varying brazing atmospheres according to the invention are set forth in the following Table I.

TABLE I

| | | | | | | | | |
|---|---|---|---|---|---|---|---|---|
| NOMINAL COMPOSITION OF ATMOSPHERE (BALANCE $N_2$) | $H_2$ (%) | 3 | 3 | 3 | 7 | 3 | 4 | 4 |
| | D.P. (°C.) | −45 to −35 | −25 to −15 | −8 to 0 | −8 to 0 | +5 to +11 | −25 to −15 | −6 to +2 |
| | Nominal $H_2O$ (%) | 0.013 | 0.102 | 0.432 | 0.432 | 1.059 | 0.102 | 0.510 |
| | $H_2/H_2O$ Ratio | 236 | 29 | 7 | 16 | 3 | 39 | 8 |
| | CO (%) | — | — | — | — | — | 2 | 2 |
| | $CO_2$ (%) | — | — | — | — | — | 0.1 | 0.1 |
| | $CO/CO_2$ Ratio | — | — | — | — | — | 20 | 20 |
| | $H_2$ + CO (%) | 3 | 3 | 3 | 7 | 3 | 6 | 6 |
| | $H_2O$ + $CO_2$ (%) | 0.013 | 0.102 | 0.432 | 0.432 | 1.059 | 0.202 | 0.610 |
| | $H_2$ + CO/$H_2O$ + $CO_2$ Ratio | 236 | 29 | 7 | 16 | 3 | 30 | 10 |
| | Expt. No. | 216 | 217-A | 217-B | 217-C | 217-D | 217-F | 217-E |
| PASTE[a] | | (1) | (2) | (3) | (4) | (5) | (6)[b] | (7)[b] |
| 100% 20H | | 10 | 17 | 22 | 24 | 24 | 18 | 24 |
| 75% 20H + 25% 25% 15H | | 15 | 21 | 24 | 25 | 25 | 21 | 23 |
| 50% 20H + 50% 15H | | 20 | 24 | 25 | 25 | 24 | 22 | 25 |
| 25% 20H + 75% 15H | | 22 | 24 | 25 | 25 | 24 | 25 | 24 |
| 100% 15H | | 22 | 24 | 25 | 25 | 18 | 22 | 23 |
| C-715 | | 12 | 15 | 20 | 21 | 23 | 14 | 22 |

NOTES:
[a] Brazing pastes grades 20H, 15H and C-715 are sold commercially by Glidden Div. of SCM Corp. Grade 20H is a copper paste. Copper content is about 80%; vehicle is glycol-based. Grade 15H is a copper oxide paste. Metallic copper content is about 73%; vehicle is glycol-base. Grade C-715 is a copper paste. Copper content is about 77%; vehicle is water-base.
[b] Atmosphere produced by mixing 90% $N_2$ + 10% endo + some moisture to adjust dew point.

The atmospheres set forth in Table I were utilized in several experiments for brazing parts comprising automobile internal combustion engine fuel pumps. These parts were comprised of carbon steel and with each atmosphere, several different paste compositions were utilized. Initially, it will be noted that the total hydrogen plus carbon monoxide content of each atmosphere did not exceed 7% and in each case where both such components were present, the quantity of hydrogen exceeded the quantity of carbon monoxide. Also, various dew points or furnace atmosphere moisture contents were utilized and in each experiment, nitrogen comprised at least 90% of the furnace atmosphere. It will also be understood that the atmospheres set forth in detail in Table I were measured in the absence of parts being supplied to the brazing furnace as such parts tend to release $CO_2$ and hydrogen upon the volatilization of paste in addition to any oxygen which may be brought along with such parts into the furnace.

As also set forth in detail in Table I, several paste compositions have been utilized with each atmosphere and the particular type of paste utilized and results obtained thereby will now be discussed. The paste identified as "15H" is a copper oxide paste having a metallic copper content of approximately 73% and a glycol based vehicle. The paste identified as "20H" is a copper paste having a metallic copper content of about 80% with a glycol based vehicle. The paste identified as "C-715" is also a copper paste with a copper content of about 77% and a water based vehicle. All of the foregoing paste materials are available from the Glidden Division of SCM Corporation. The numerical values associated with each paste composi- and furnace atmosphere constitute a rating of several properties of the paste when utilized with the particular atmosphere indicated in Table I. These properties are flow, penetration, beading, residue and soot and for each property, a value of 0 to 5 has been given with the highest value being associated with the most desirable attribute of each property. Thus, with a paste that flows well upon passing through a furnace having a particular atmosphere, a value of 4 or 5 would be ascribed to this characteristic. Similarly, the ability of molten copper to penetrate a joint between parts have been given a value between 0 and 5 depending on the extent of such penetration. However, the lack of beading, residue and soot have also been given values between 0 and 5 with the highest value indicating the greatest lack of these properties. The total of all five values representing the aforementioned properties of a particular paste utilized with the atmosphere listed above in Table I has been entered as will appear in this Table. Thus, in some instances, very high ratings of 24 to 25 have been obtained indicating that excellent properties of flow, penetration, beading, etc. have been obtained. With reference now to Table I, it will be noted that under the very low dew point atmospheres, purely copper pastes (20H and C-715) have yielded properties which are relatively undesirable. For example, use of 100% 20H paste yielded a value of 10 or a relatively poor total of values ascribed to each of the properties mentioned above. Consequently, with the atmosphere listed in the first column of Table I, the use of a purely copper paste is not recommended. It is believed that as such paste does not contain any oxygen in the form of copper oxide, a less than complete volatilization of the paste vehicle has resulted and consequently, unreacted carbon has remained which formed a residue and/or soot and caused beading which in turn reduced flow and penetration qualities of the particular paste. Although in connection with some atmospheres, a purely copper paste is suitable (under dew points of for example $-8°$ to $+10°$ C.), in general, a combination of copper and copper oxide pastes yields more desirable properties concerning the ability of such paste to provide acceptable brazing characteristics.

From the data set forth in Table I, it will be apparent that the process according to the invention enables a particular atmosphere to be selected in accordance with the requirements of the brazing operation and also enables selection of a particular paste which provides optimal brazing properties in conjunction with the selected atmosphere. Thus, the process according to the invention is highly flexible brazing process in that both brazing atmospheres and paste compositions may be selected so as to yield the most desirable brazing characteristics without reliance upon hydrocarbon derived atmospheres. Also, clean surfaces are maintained by the atmosphere according to this invention and surface decarburization is substantially avoided. The higher values associated with particular paste compositions indicate that flow, penetration, beading, etc. are all highly satisfactory and thus part surfaces are rendered "metallurgically" clean. Finally, as the reducing capability of the brazing atmospheres according to the invention is limited by constraining the total hydrogen and carbon monoxide content thereof to approximately 7%, heat losses are reduced, adverse effects on furnace materials such as insulating brick or the like are also reduced and the useful life of such furnace materials is prolonged. Also, by limiting the oxidation potential of the brazing atmospheres by constraining moisture and $CO_2$ components of such atmospheres, the tendency of brazing atmospheres according to the invention to oxidize furnace elements such as conveyor belts or the like is also significantly reduced and consequently, belt life is substantially extended. In summary, the brazing process according to the invention enables the effective copper brazing of ferrous parts with atmospheres which are not derived fully from hydrocarbon sources, are safe due to the high proportion of inert gas therein and which do not adversely affect furnace material such as insulating brick and conveyor belts but also enable strong brazed joints to be obtained without being limited to a single, particular brazing paste.

Referring now to FIG. 1, illustrated therein is an exemplary embodiment of a brazing furnace 10 adapted to enable the brazing of ferrous parts in accordance with the invention. Such parts (not shown) are passed through furnace 10 by means of a conveyor belt 13 which is driven by rolls 15. The furnace has for purposes of description of the invention, several sections including a preheat zone 12, hot zone 14, slow cool zone 16 and a normal cool zone 18. Although the foregoing zones of furnace 10 have been illustrated as being discrete portions of the furnace, it will be appreciated that such zones are open to one another and are illustrated as separate zones only for purposes of facilitating a full understanding of the present invention. A supply of hydrogen with or without carbon monoxide is passed through conduit 20 and which is joined by a flow of nitrogen through conduit 22 for introduction into the preheat, hot and slow cool zones of furnace 10. Essentially only nitrogen is preferably supplied to normal cool zone 18 as mentioned heretofore. In addition, a flow of moisture which is controlled to establish predetermined dew points in furnace 10 may be passed to preheat, hot and slow cool zones through conduit 24. It will be understood that brazing atmospheres according to the invention may be introduced into furnace 10 by means other than the apparatus shown in FIG. 1. For example, such atmospheres may be pre-mixed prior to introduction into the furnace or individual constituents may be separately supplied to furnace 10 as depicted in FIG. 1.

Figure 2:
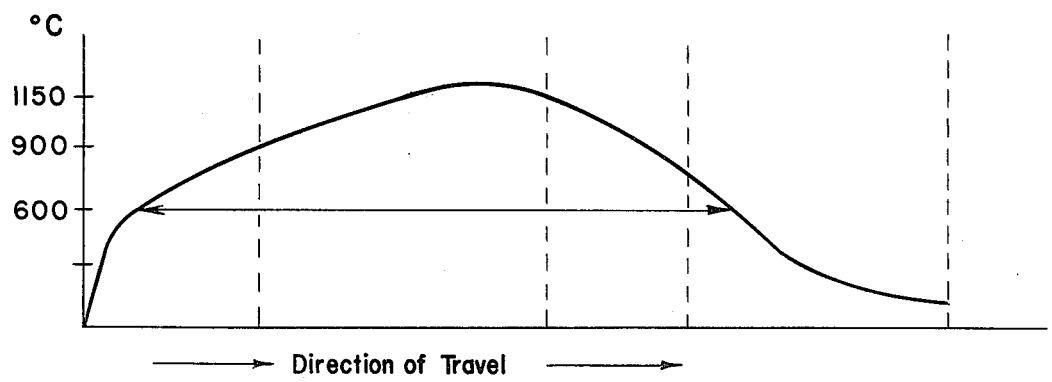
FIG. 2 is a graphical representation of a typical temperature profile of such furnace during a brazing process.

Illustrated in FIG. 2 is a typical temperature profile of furnace 10 during the brazing of ferrous parts therein (using a copper paste) in accordance with the invention. A lower temperature profile will result upon use of copper alloy pastes. The brazing atmosphere utilized in this process are established essentially within the 600° C. profile of the furnace, i.e. between the locations in the furnace wherein the temperature is above 600° C.

It will be understood that hydrogen may be obtained from a pure hydrogen source, from dissociated ammonia, from endothermic or exothermic gas, thermal decomposition of alcohol or from reaction products of a hydrocarbon with an oxidant in the furnace.

The lower limit of −40° C. to the dew point of the brazing atmospheres according to the invention is to provide a very thin, protective adherent oxide coating to high alloy components of the furnace such as the belt and muffle thus providing increased life to these components.

The preferred form of brazing paste for use with the process according to the invention may be a mixture of copper and copper oxide pastes. However, appropriate amounts of copper and copper oxides may be mixed together to form a single, composite paste. The term 'oxide' is considered to be the equivalent of copper oxide or copper alloy oxide or a mixture thereof.

The foregoing and other various changes in form and details may be made without departing from the spirit and scope of the present invention. Consequently, it is intended that the appended claims be interpreted as including all such changes and modifications.

I claim:

1. A process for copper brazing ferrous parts in a continuous furnace comprising the steps of: heating said furnace to establish a region therein at a temperature of at least 600° C.; establishing an atmosphere in said region under equilibrium conditions in the absence of parts comprised of at least 90% nitrogen, at total of about 1.0 to 7.0% hydrogen and carbon monoxide, wherein the concentration of hydrogen is greater than the concentration of carbon monoxide, and moisture sufficient to provide a dew point of about −40° C. to +10° C.; and passing through said furnace said ferrous parts having thereon a brazing paste comprised of a copper paste and 25-75% of a copper oxide paste whereby said parts are brazed.

2. The process defined in claim 1 wherein said atmosphere includes 0-2.0% carbon dioxide.

3. The process defined in claim 2 wherein the combined construction of moisture and carbon dioxide of said atmosphere does not exceed about 3.0%.

4. The process defined in claim 1 wherein the atmosphere in the portion of said furnace under an increasing temperature in the direction of travel of said parts between 600°-900° C. exhibits a dew point between −20° to +10° C.

5. The process defined in claim 1 wherein a portion of said furnace is heated to a brazing temperature of at least 850° C. and the atmosphere in the portion of said furnace having a decreasing temperature in the direction of travel of said parts between said brazing temperature and 600° C. exhibits a dew point in the range of −40° to −10° C.

6. A process for copper brazing ferrous parts in a continuous furnace having at least one region heated to a temperature of at least 600° C. comprising:

(a) providing an atmosphere in said furnace under equilibrium conditions in the absence of parts comprised of at least 90% nitrogen, from about 1.0% to 7.0% hydrogen and carbon monoxide, wherein the concentration of hydrogen is greater than the concentration of carbon monoxide, and moisture sufficient to provide a dew point of between about −40° C. and +10° C.;

(b) applying to said ferrous parts a brazing mixture comprising 25-75% copper oxide paste and the balance a copper paste; and (c) passing said parts through a region of said furnace at a temperature sufficient to cause brazing of said parts.

7. The process of claim 6 wherein said atmosphere further comprises from 0% to 2.0% carbon dioxide.

8. The process of claim 7 wherein the combined concentration of moisture and carbon dioxide in said atmosphere does not exceed about 3.0%.

9. The process of claim 6 wherein said atmosphere is comprised of about 1% combined hydrogen and carbon monoxide.

10. The process of claim 6 wherein said furnace contains a first region heated to a temperature of between about 600° to 900° C. and said atmosphere in said first region contains sufficient moisture to provide a dew point of between about −20° C. and +10° C.

11. The process of claim 6 wherein said furnace contains a second region heated to a temperature of from about 850° C. to 1150° C. and said atmosphere in said second region contains sufficient moisture to provide a dew point of between about −40° C. and +10° C.

12. A process for the copper brazing of ferrous parts in a continuous furnace having a preheat zone varying in temperature from about 600° C. to about 900° C. and a hot zone varying in temperature from about 850° C. to about 1150° C. comprising:

(a) providing a first atmosphere in said preheat zone under equilibrium conditions in the absence of parts comprised of at least 90% nitrogen, from about 1.0% to 7.0% hydrogen and carbon monoxide wherein the concentration of hydrogen is greater than the concentration of carbon monoxide and moisture sufficient to provide a dew point of from about −20° C. to +10° C.;

(b) providing a second atmosphere in said hot zone under equilibrium conditions in the absence of parts comprised of at least 90% nitrogen, from about 1.0% to 7.0% hydrogen and carbon monoxide wherein the concentration of hydrogen is greater than the concentration of carbon monoxide and moisture sufficient to provide a dew point of from about −40° C. to −10° C., the dew point of said first atmosphere being greater than the dew point of said second atmosphere;

(c) applying to said ferrous parts a copper containing brazing paste; and (d) passing said parts through said preheat zone and said hot zone to cause brazing thereof.

13. The process of claim 12 wherein said atmosphere further comprises from 0% to 2.0% carbon dioxide.

14. The process of claim 12 wherein said atmosphere is comprised of about 1% combined hydrogen and carbon monoxide.

15. A process as defined in claim 12 wherein said furnace includes a zone after the hot zone in the direction of travel of said parts wherein the temperature is below 600° C. and additionally comprising the step of maintaining an atmosphere consisting essentially of nitrogen in said zone.

* * * * *

UNITED STATES PATENT AND TRADEMARK OFFICE
CERTIFICATE OF CORRECTION

PATENT NO. : 4,294,395
DATED : October 13, 1981
INVENTOR(S) : HARBHAJAN S. NAYAR It is certified that error appears in the above-identified patent and that said Letters Patent are hereby corrected as shown below:

Column 2, line 14, after "that" should be inserted --the--.

Column 3, line 53, after and, "heting" should read --heating--;
   line 65, "as", second occurrence, should read --a--.

Column 5, line 25, after 25, should read -- - --.

Column 6, line 57, "furance" should read --furnace--;
   line 67, after "while" insert --in--;
   line 68, "40'" should read --40°--.

Table I, under PASTE, line 2, delete "25%", second occurrence.

Column 7, line 64, "furance" should read --furnace--.

Column 9, line 23, "composi" should read --composition--;
   line 34, "have" should read --has--.

Column 10, line 5, after "is", should be inserted --a--.

Claim 3, line 48, "construction" should read -concentration--.

Claim 11, line 5, "+10" should read -- -10 --.

Signed and Sealed this

Fifth Day of January 1982

[SEAL]

Attest:

GERALD J. MOSSINGHOFF

Attesting Officer     Commissioner of Patents and Trademarks